United States Patent
Hao et al.

(10) Patent No.: US 11,726,266 B2
(45) Date of Patent: Aug. 15, 2023

(54) STRUCTURED SURFACE AND OPTICAL FERRULE INCLUDING SAME

(71) Applicant: 3M INNOVATIVE PROPERTIES COMPANY, St. Paul, MN (US)

(72) Inventors: Bing Hao, Woodbury, MN (US); James M. Nelson, Lino Lakes, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/619,273

(22) PCT Filed: Jun. 11, 2020

(86) PCT No.: PCT/IB2020/055502
§ 371 (c)(1),
(2) Date: Dec. 15, 2021

(87) PCT Pub. No.: WO2020/261026
PCT Pub. Date: Dec. 30, 2020

(65) Prior Publication Data
US 2022/0299712 A1    Sep. 22, 2022

Related U.S. Application Data

(60) Provisional application No. 62/868,145, filed on Jun. 28, 2019.

(51) Int. Cl.
*G02B 6/38* (2006.01)
(52) U.S. Cl.
CPC .................. *G02B 6/3818* (2013.01)
(58) Field of Classification Search
CPC ... G02B 6/3818; G02B 5/0294; G02B 6/4207
See application file for complete search history.

(56) References Cited

U.S. PATENT DOCUMENTS 5,175,030 A   12/1992   Lu
5,183,597 A    2/1993   Lu
(Continued)

FOREIGN PATENT DOCUMENTS

JP   2004-012720    1/2004
JP   2004-361906   12/2004
(Continued)

OTHER PUBLICATIONS

Sun, "Broadband moth-eye antireflection coatings on silicon", Applied Physics Letters, 2008, vol. 92, pp. 061112(01-03).
(Continued)

*Primary Examiner* — Sung H Pak
(74) *Attorney, Agent, or Firm* — Clifton F. Richardson

(57) ABSTRACT

A structured surface reduces optical reflectance at a predetermined wavelength in a first wavelength range extending from 600 nm to 1700 nm. The structured surface includes a plurality of parallel linear structures arranged along a first direction and extending along an orthogonal second direction. Each linear structure includes opposing nonlinear facets meeting at a peak extending along the second direction. An average spacing between the peaks of adjacent linear structures is less than the predetermined wavelength, such that for light having the predetermined wavelength and incident on the structured surface in a direction substantially perpendicular to the first and second directions, the structured surface has a reflectance $R_x < 0.5\%$ for light polarized along the first direction and a reflectance $R_y < 0.5\%$ for light polarized along the second direction, where an absolute value of $R_x - R_y$ is less than 0.3%. An optical ferrule may have an exit surface that includes the structured surface.

9 Claims, 10 Drawing Sheets

(56) References Cited

U.S. PATENT DOCUMENTS

| | | | |
|---|---|---|---|
| 5,384,571 A | 1/1995 | Myers | |
| 5,691,846 A | 11/1997 | Benson, Jr. | |
| 7,185,993 B2 | 3/2007 | Smith | |
| 2004/0027676 A1* | 2/2004 | Nilsen | G02B 6/0036 359/619 |
| 2008/0130110 A1 | 6/2008 | Nakai | |
| 2010/0165468 A1* | 7/2010 | Yamada | G02B 5/003 359/613 |
| 2015/0247979 A1 | 9/2015 | Richmond | |
| 2016/0282565 A1 | 9/2016 | Childers | |
| 2018/0128996 A1 | 5/2018 | Sawicki | |
| 2018/0239091 A1 | 8/2018 | Mathews | |
| 2018/0275353 A1 | 9/2018 | Haase | |
| 2018/0275355 A1 | 9/2018 | Haase | |
| 2018/0284356 A1 | 10/2018 | Haase | |
| 2019/0049671 A1 | 2/2019 | Haase | |

FOREIGN PATENT DOCUMENTS

| | | |
|---|---|---|
| JP | 2013-097164 | 5/2013 |
| JP | 2015-212809 | 11/2015 |
| WO | WO 2019-039049 | 2/2019 |
| WO | WO 2020-003117 | 1/2020 |
| WO | WO 2020-003124 | 1/2020 |
| WO | WO 2020-003245 | 1/2020 |

OTHER PUBLICATIONS

International Search report for PCT International Application No. PCT/IB2020/055502 dated Sep. 8, 2020, 6 pages.

* cited by examiner

STRUCTURED SURFACE AND OPTICAL FERRULE INCLUDING SAME

CROSS REFERENCE TO RELATED APPLICATIONS

This application is a national stage filing under 35 U.S.C. 371 of PCT/IB2020/055502, filed Jun. 11, 2020, which claims the benefit of U.S. Provisional Application No. 62/868,145, filed Jun. 28, 2019, the disclosures of which are incorporated by reference in their entireties herein.

BACKGROUND

Optical connectors can be used for optical communications in a variety of applications including telecommunications networks, local area networks, data center links, and internal links in computer devices. An optical connector may include an optical ferrule.

A surface may include nanostructures to reduce reflection from the surface.

SUMMARY

In some aspects of the present description, a structured surface configured to provide a low, polarization insensitive reflectance is provided. In some embodiments, the structured surface extends generally along orthogonal first and second directions, and for light having a predetermined wavelength and incident on the structured surface in a direction substantially perpendicular to the first and second directions, the structured surface has a reflectance Rx<0.5% for light polarized along the first direction and a reflectance Ry<0.5% for light polarized along the second direction, where an absolute value of Rx−Ry is less than about 0.3%. In some embodiments, the structured surface is a major surface of an optical film. In some embodiments, the structured surface is a light exit surface of an optical ferrule.

In some aspects of the present description, first and second structured surfaces facing, spaced apart from, and substantially aligned with, each other are provided. The first and second structured surfaces may be configured such that a combination of the first and second structured surfaces provides a polarization insensitive transmittance. In some embodiments, the structured surfaces extend generally along orthogonal first and second directions, and for light having a predetermined wavelength and incident on the structured surfaces in a direction substantially perpendicular to the first and second directions, a difference between optical transmittances of the combination of the first and second surfaces for the two mutually orthogonal polarization states is less than about 0.3%. In some embodiments, the first and second structured surfaces are light exit surfaces of first and second optical ferrules that are mated to each other.

In some aspects of the present description, a structured surface for reducing optical reflectance at a predetermined wavelength in a first wavelength range extending from about 600 nm to about 1700 nm is provided. The structured surface includes a plurality of substantially parallel linear structures arranged along a first direction and extending along a substantially orthogonal second direction. Each linear structure includes opposing nonlinear facets meeting at a peak extending along the second direction. An average spacing between the peaks of adjacent linear structures is less than the predetermined wavelength, such that for light having the predetermined wavelength and incident on the structured surface in a direction substantially perpendicular to the first and second directions, the structured surface has a reflectance Rx<0.5% for light polarized along the first direction and a reflectance Ry<0.5% for light polarized along the second direction, where an absolute value of Rx−Ry is less than about 0.3%.

In some aspects of the present description, a structured surface including a plurality of substantially parallel linear structures arranged along a first direction and extending along a substantially orthogonal second direction is provided. Each linear structure includes opposing curved facets meeting at a peak extending along the second direction, such that in a cross-section of the structured surface in a plane substantially perpendicular to the second direction and for at least one linear structure, the linear structure includes: opposing curved sides including first ends meeting at a peak of the structure and opposing second ends defining a base extending therebetween along substantially the first direction; and a peak height H relative to the base. For at least one of the opposing curved sides, a local height h of the curved side is governed by the equation: $h = f1(2H/P)t + (1-f1)(4H/P^2)t^2$, where P is separation between the opposing second ends of the structure, t is distance from the second end of the curved side along the base, and $0.2 < f1 < 0.8$. For light incident on the structured surface in a direction substantially perpendicular to the first and second directions, the structured surface has an average reflectance less than about 0.5% for each of two orthogonal polarization states in a wavelength range extending from about 700 nm to about 1600 nm.

In some aspects of the present description, an optical ferrule for coupling light to a mating optical ferrule through an exit surface of the optical ferrule is provided. A difference between optical transmittances of the exit surface for two mutually orthogonal polarization states is greater than a first value. When the optical ferrule mates with the mating optical ferrule having a mating exit surface similar to the exit surface of the optical ferrule with the exit surface and the mating exit surface facing, and substantially aligned with, each other, a difference between optical transmittances of a combination of the exit surface and the mating exit surface for the two mutually orthogonal polarization states is less than a second value. The second value is less than the first value.

In some aspects of the present description, an optical assembly is provided. The optical assembly includes a first optical ferrule optically coupled to a first optical fiber and including a plurality of substantially parallel first linear structures extending along a first direction; and a second optical ferrule optically coupled to a second optical fiber and including a plurality of substantially parallel second linear structures extending along a second direction. The first optical ferrule is mated with the second optical ferrule. When light is transmitted from one of the first and second optical fibers to the other one of the first and second optical fibers through the first and second optical ferrules, the light passes through the first and second linear structures, such that for a predetermined wavelength in a wavelength range extending from about 600 nm to about 1700 nm, a difference in optical transmittances for two mutually orthogonal polarization states between the first and second optical fibers is greater than about 0.5% when the first and second directions are parallel to each another, and less than about 0.3% when the first and second directions are substantially orthogonal to each other.

DETAILED DESCRIPTION

Figure 1:
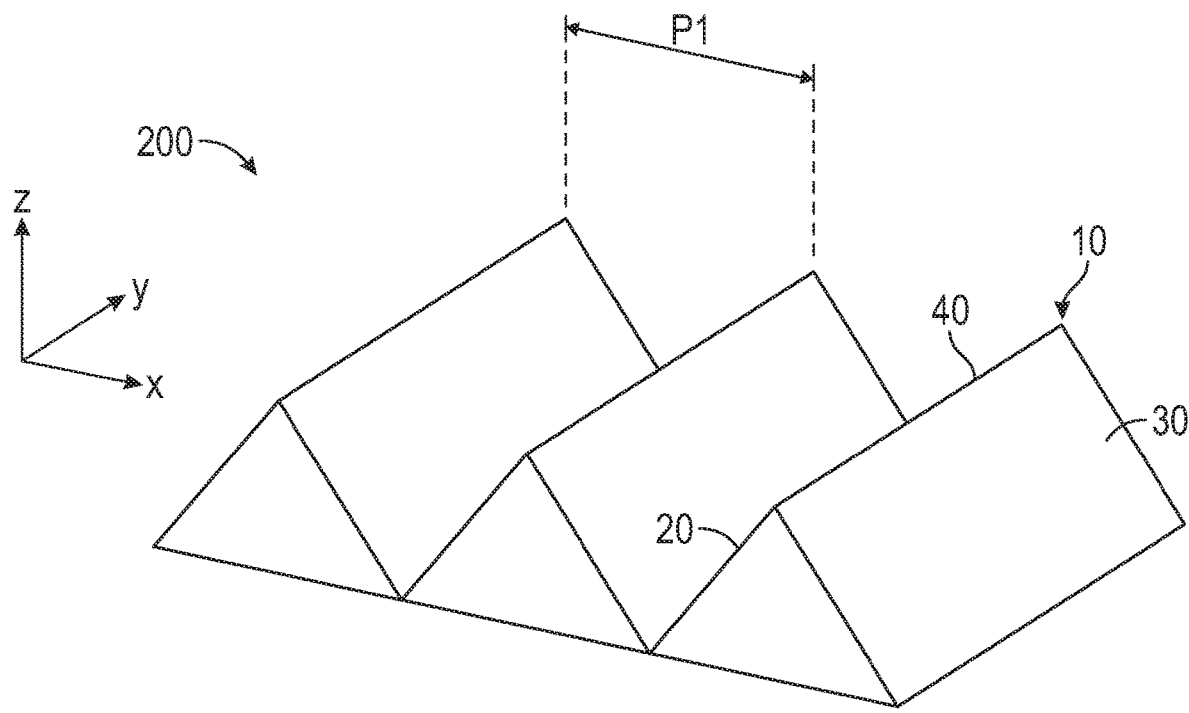
FIG. 1 is a schematic top perspective view of a structured surface.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

In some embodiments, a structured surface for reducing optical reflectance is provided. The structured surface can be formed on a film or on a light exit surface of an optical ferrule, for example. In some embodiments, each optical ferrule in a pair of mated optical ferrules includes the structured surface on the light exit surface. In some embodiments, first and second mated optical ferrules include respective first and second structured light exit surfaces having linear structures with different orientations such that the different orientations result in reduced polarization dependence of the optical transmittance through the combination of the exit surfaces of the mated optical ferules. In some embodiments, the structured surfaces of the mated optical ferrules result in low optical loss (e.g., less than about 0.7 dB overall loss and/or less than about 0.05 dB loss due to reflection at the light exit surfaces) between optical fibers of the mated optical ferrules.

The structured surface can include a plurality of linear structures (e.g., extending linearly along a direction). In some embodiments, the linear structures have a geometry (e.g., curved sides or facets having a shape between planar sides or facets and parabolic sides or facets) that reduces the polarization dependence of reflectance from the surface and/or reduces the polarization dependence of the transmittance through the surface. In some embodiments, the optical absorbance of the article or layer including the structured surface is negligible, so that the transmittance is substantially 100 percent minus the reflectance. It has been found that utilizing shapes intermediate between planar and parabolic provides a reflectivity with a reduced dependence on polarization and allows a reduced structure height H to be used (for a given structure width P) while providing a desired reflectivity for different polarization states (e.g., less than about 0.5% for each of two orthogonal polarization states with less than about 0.3% difference in reflectance for the different polarization states). Such low reflectivity with low polarization dependence is often desired in optical interconnect applications. The reduced aspect ratio (e.g., height H divided by width P less than about 2 or less than about 1.5 and in some embodiments, greater than about 0.9 or greater than about 1) allows the structures to be manufactured and/or processed more easily and results in more robust structures (e.g., more resistant to abrasion). For example, in some embodiments, the structures can be formed with an optical ferrule in a single molding step and this simplifies manufacturing compared to vacuum depositing an antireflection coating, for example, onto an exit surface of the ferrule after the ferrule has been formed.

Figure 2:
FIG. 2 is a schematic illustration of a wavelength range.
Figure 3A:
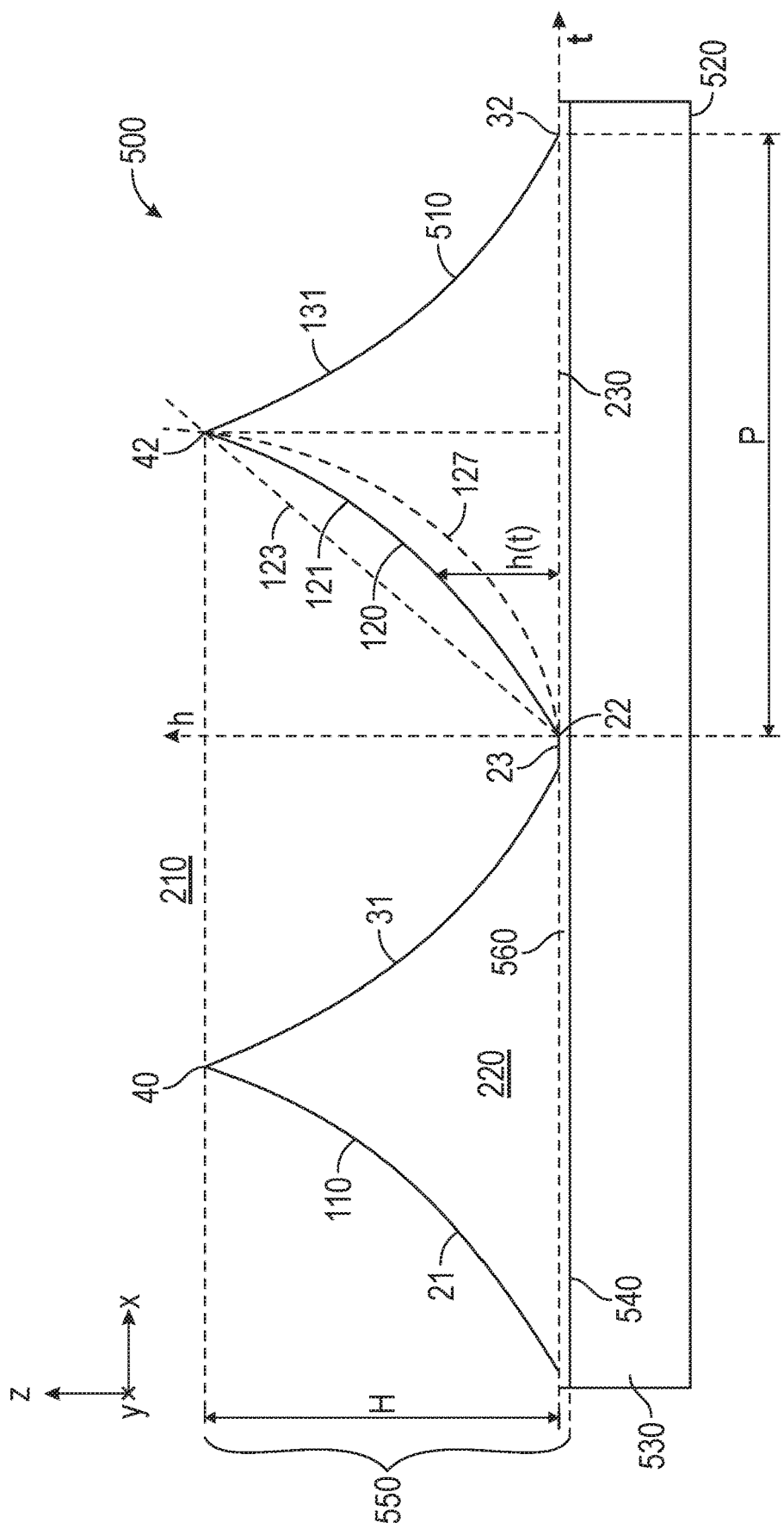
FIG. 3A is a schematic cross-sectional view of an optical film.

FIG. 1 is a schematic top perspective view of a structured surface 200 including a plurality of substantially parallel linear structures 10 arranged along a first direction (x-direction) and extending along a substantially orthogonal second direction (y-direction). The structured surface 200 is for reducing optical reflectance at a predetermined wavelength 201. In some embodiments, as schematically illustrated in FIG. 2, the predetermined wavelength 201 is in a first wavelength range extending from $\lambda1$ to $\lambda2$ where $\lambda1$ is about 600 nm or about 700 nm and $\lambda2$ is about 1700 nm or about 1600 nm. For example, the first wavelength range may extend from about 600 nm to about 1700 nm, or from about 700 nm to about 1600 nm. Each linear structure 10 includes opposing facets 20 and 30 meeting at a peak 40 extending along the second direction (y-direction). In some embodiments, the facets 20 and 30 are substantially linear or planar. In some preferred embodiments, for at least one of the linear structures 10, at least one of the facets 20 and 30 is nonlinear (e.g., curved). In some embodiments, as schematically illustrated in FIG. 3A, each linear structure 110 (corresponding to linear structure 10) includes opposing nonlinear facets 21 and 31 meeting at a peak 40 extending along the second direction (y-direction). In some embodiments, an average spacing P1 between the peaks of adjacent linear structures is less than the predetermined wavelength 201 such that for light having the predetermined wavelength 201 and incident on the structured surface in a direction (e.g., plus or minus z-direction) substantially perpendicular to the first and second directions, the structured surface has a reflectance $Rx<0.5\%$ for light polarized along the first direction and a reflectance $Ry<0.5\%$ for light polarized along the second direction, where an absolute value of $Rx-Ry$ is less than about 0.3%, or less than about 0.25%, or less than about 0.2%.

Figure 3B:
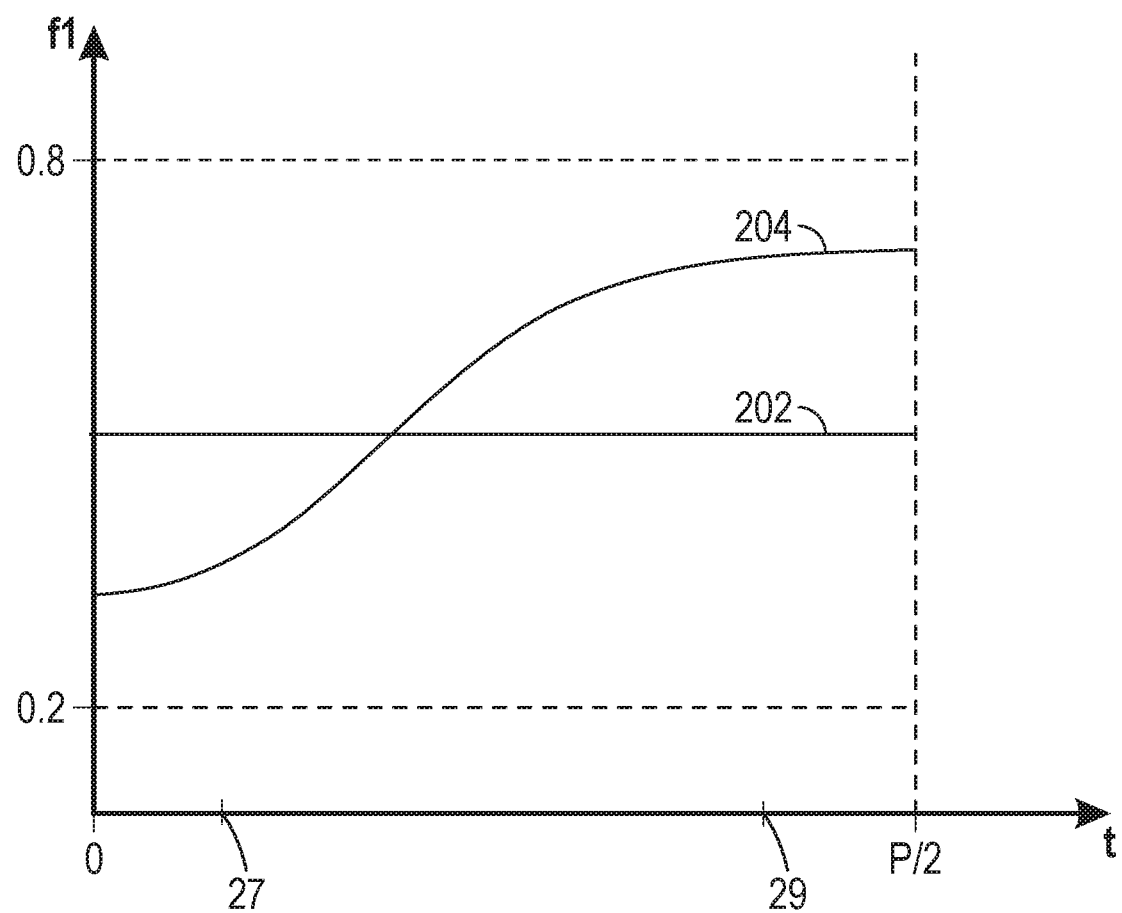
FIG. 3B is a schematic plot of f1 parameters for curved sides.
Figure 4A:
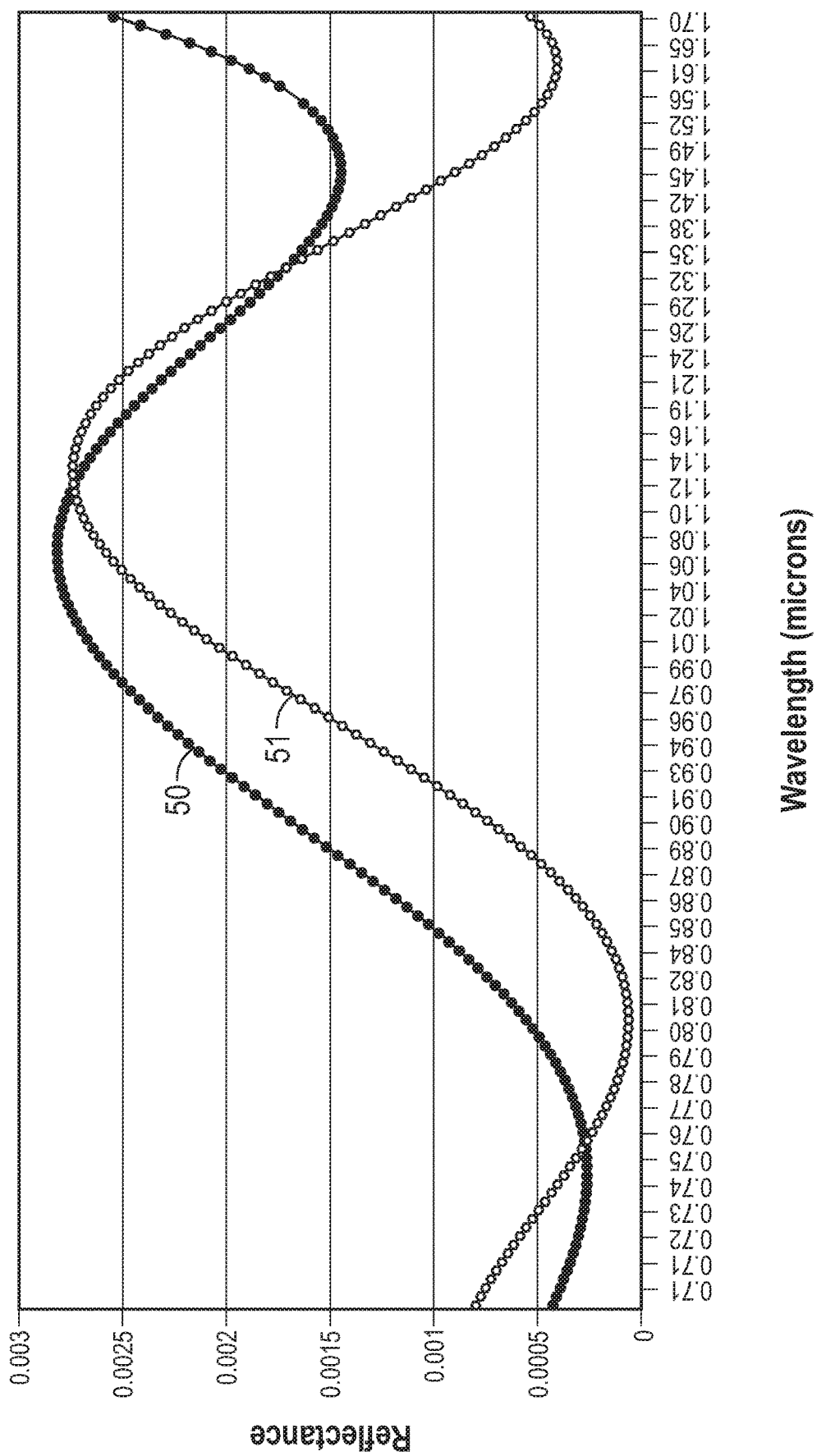
FIG. 4A is a plot of reflectances versus wavelength for an exemplary structured surface and for orthogonal polarization states.
Figure 4B:
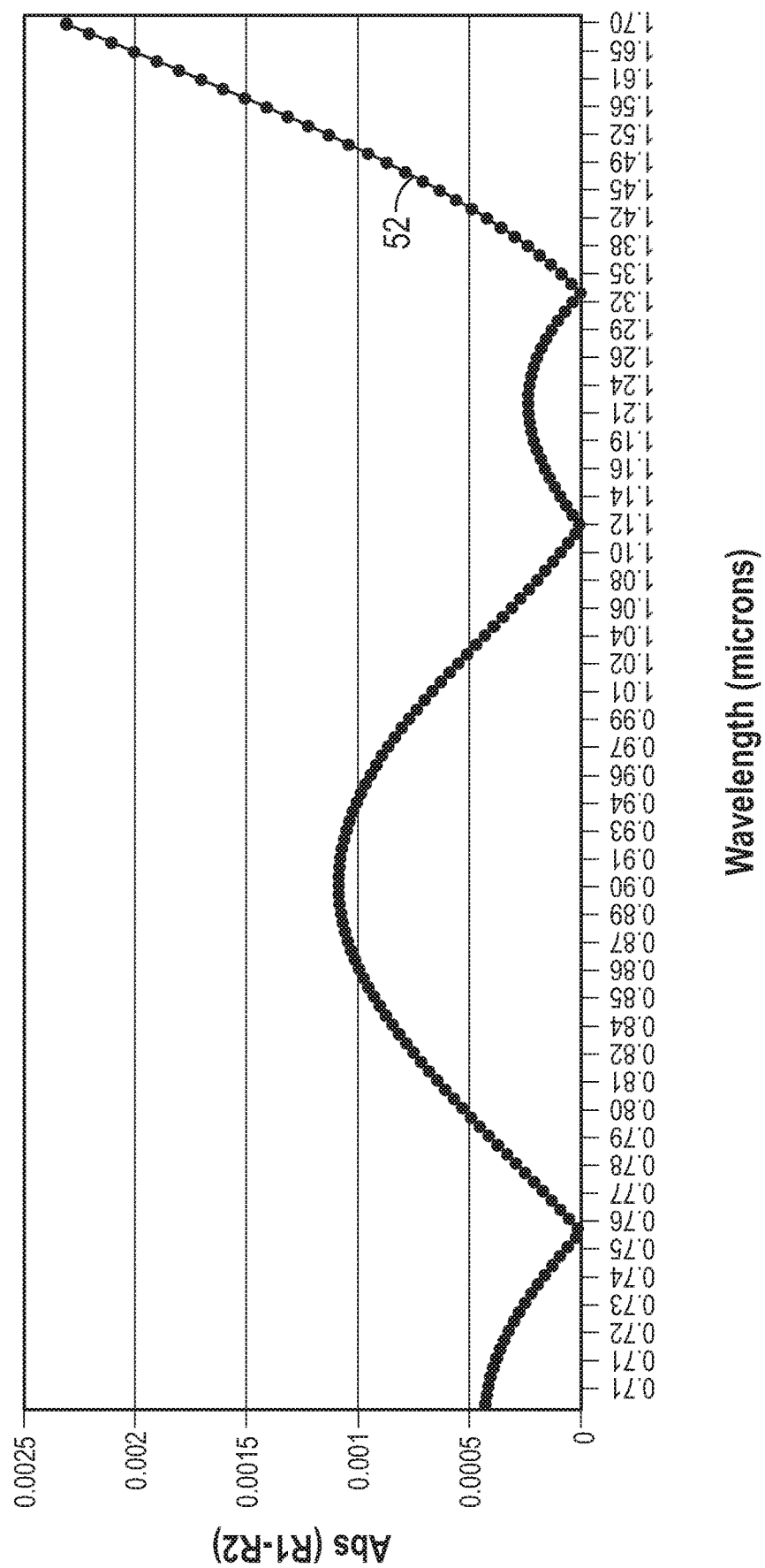
FIG. 4B is a plot of the absolute value of the difference in the reflectances of FIG. 4A for the orthogonal polarization states as a function of wavelength.

FIG. 4A is a plot of reflectance Rx (50) and Ry (51) versus wavelength for an exemplary structured surface having linear nanostructures having a distance P between the opposing second ends of the structure of 400 nm, a peak height H relative to a base 230 of 625 nm, and opposing curved sides having a local height h governed by the equation: $h = f1(2H/P)t + (1-f1)(4H/P^2)t^2$, where t is the distance from the second end of the curved side along the base, and f1 is 0.6 in this example. Other useful values or ranges for the parameter f1 are described further elsewhere herein (see, e.g., FIG. 3B). FIG. 4B is a plot of the absolute value 52 of Rx−Ry as a function of wavelength. In some embodiments, $Rx<0.4\%$, $Ry<0.4\%$, and the absolute value of Rx−Ry is less than about 0.2%. In some embodiments, $Rx<0.3\%$, $Ry<0.3\%$, and the absolute value of Rx−Ry is less than about 0.2%. In some embodiments, for each wavelength in the first wavelength range and for light incident on the structured surface in the direction (plus or minus z-direction) substantially perpendicular to the first and second directions, the structured surface has a first reflectance less than 0.5% for light polarized along the first direction and a second reflectance less than 0.5% for light polarized along the second direction, an absolute value of the difference between the first and second reflectances being less than about 0.3%.

In some embodiments, P1 is in a range of 300 nm to 700 nm, or 400 nm to 600 nm, for example. In some embodiments, P is in a range of 300 nm to 700 nm, or 400 nm to 600 nm, for example. In some embodiments, 1.2 P≥P1≥P, for example. In some embodiments, H is in a range of 400 nm to 1100 nm, or 500 nm to 1000 nm, or 500 nm to 900 nm, for example. In some embodiments, H/P is in a range of 0.9 to 2, or 1 to 1.5, for example.

The reflectances Rx and Ry can be determined for light propagating generally along either the plus z-direction or the minus z-direction. In some embodiments, the structured surface is exposed to an exterior medium (e.g., air or a coating material or a material of an immersion systems (e.g., a liquid of a liquid cooling system)) and defines an exterior side 210 (e.g., in the medium) opposite an interior side 220 (e.g., within a layer of a film including the structured surface). In some embodiments, for light having the predetermined wavelength 201 and incident on the structured surface from the exterior side of the structured surface in the direction (minus z-direction) substantially perpendicular to the first and second directions, Rx<0.5%, Ry<0.5%, and the absolute value of Rx−Ry is less than about 0.3%, or less than about 0.25%, or less than about 0.2%. In some embodiments, for light having the predetermined wavelength 201 and incident on the structured surface from the interior side of the structured surface in the direction (plus z-direction) substantially perpendicular to the first and second directions, Rx<0.5%, Ry<0.5%, and the absolute value of Rx−Ry is less than about 0.3%, or less than about 0.25%, or less than about 0.2%. In some embodiments, the structured surface is exposed to air and defines an air side 210 opposite an interior side 220, where for light having the predetermined wavelength 201 and incident on the structured surface from the air side of the structured surface in the direction (minus z-direction) substantially perpendicular to the first and second directions, Rx<0.5%, Ry<0.5%, and the absolute value of Rx−Ry is less than about 0.3%, or less than about 0.25%, or less than about 0.2%.

In some embodiments, the predetermined wavelength 201 is a wavelength commonly used in single mode or multi-mode optical fibers. In some embodiments, the predetermined wavelength 201 is about 850 nm, or about 1310 nm, or about 1550 nm.

As schematically illustrated in FIG. 3A, in some embodiments, at least two adjacent linear structures in the plurality of substantially parallel linear structures 110 are spaced apart defining a land surface 23 therebetween. In some embodiments, the land surface 23 is substantially planar (e.g., planar or nominally planar or sufficiently close to planar that a radius of curvature of the land surface 23 is at least 4 times, or at least 8 times, or at least 12 times the average spacing P1). In some embodiments, an optical film 500 includes a first structured major surface 510 and an opposing second major surface 520. In some embodiments, the optical film 500 includes a substrate 530 substantially transparent in the first wavelength range (e.g., having an average optical transmittance in the first wavelength range of at least 60%, or at least 75%, or at least 90%, or having an optical transmittance of at least 60%, or at least 75%, or at least 90% throughout the first wavelength range) and including the second major surface 520 and an opposing third major surface 540; and includes a structured layer 550 substantially transparent in the first wavelength range and disposed on the third major surface 540 where the structured layer 550 includes the first structured major surface 510 opposite the third major surface 540. In some embodiments, the structured layer 550 includes a land layer 560 between a base 230 of the first structured major surface and the third major surface 540.

Figure 5:
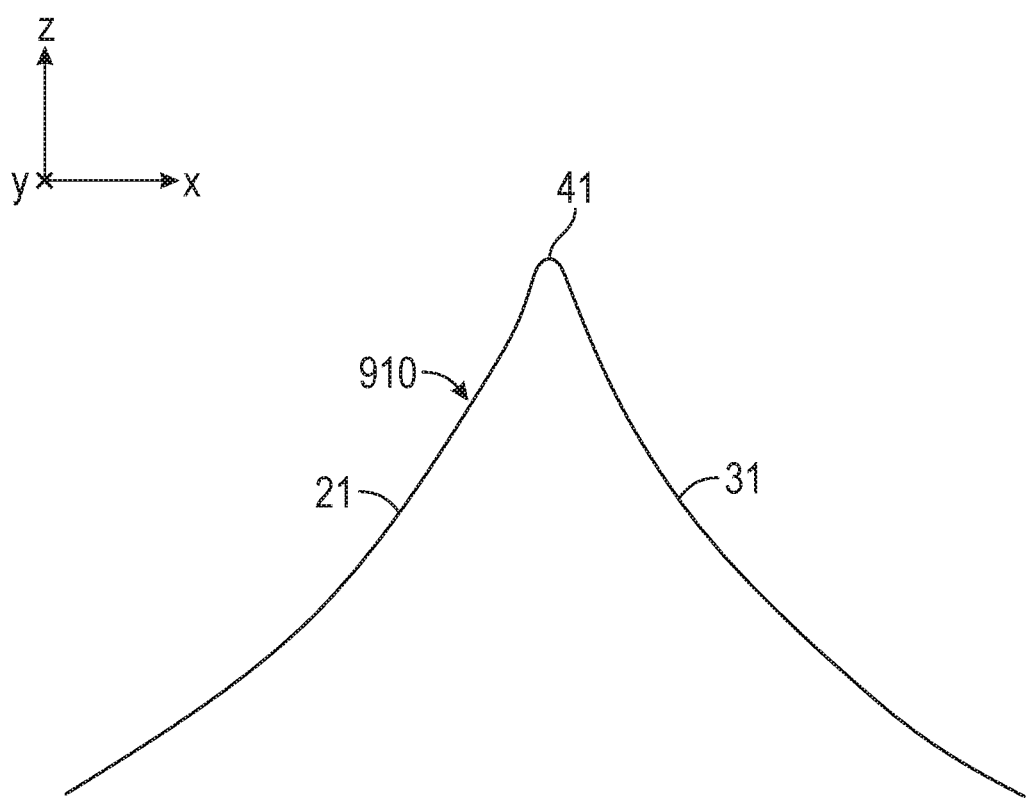
FIG. 5 is a schematic cross-sectional view of a linear structure.

In some embodiments, each linear structure 110 includes opposing nonlinear facets and meeting at a peak extending along the second direction (y-direction). In some such embodiments, the peak of at least one of the structures is round. FIG. 5 is a schematic cross-sectional view of a linear structure 910 (e.g., corresponding to at least one of the linear structures 10 or 110) including opposing nonlinear facets 21 and 31 and meeting at a peak 41 extending along the second direction (y-direction). In the illustrated embodiment, the peak 41 is round.

In some embodiments, a structured surface 510 (or some embodiments of structured surface 200) includes a plurality of substantially parallel linear structures 110 arranged along a first direction (x-direction) and extending along a substantially orthogonal second direction (y-direction), where each linear structure 110 includes opposing curved facets 21 and 31 meeting at a peak 40 (or 41) extending along the second direction (y-direction). In a cross-section of the structured surface in a plane (x-z plane) substantially perpendicular to the second direction and for at least one linear structure, the linear structure includes opposing curved sides 121 and 131 including first ends meeting at a peak (e.g., 40 or 41) of the structure and opposing second ends 22 and 32 defining a base 230 extending therebetween along substantially the first direction (e.g., along the x-direction or along a direction substantially parallel to the x-direction), and a peak height H relative to the base 230. For at least one of the opposing curved sides, a local height h of the curved side is governed by the equation: $h=f1(2H/P)t+(1-f1)(4H/P^2)t^2$, where P is the separation between the opposing second ends of the structure, t is distance from the second end of the curved side along the base, and 0.2<f1<0.8. The distance t is a non-negative quantity.

In FIG. 3A, a coordinate distance t between the second end 22 (t=0) and a first end 42 (t=P/2), a coordinate h (along the z-direction and crossing the t-axis at h=0), and a curve 120 (e.g., along curved side 121) having a local height $h(t)=f1(2H/P)t+(1-f1)(4H/P^2)t^2$ is schematically illustrated. For comparison a curve 123 corresponding to a linear side (h=(2H/P)t) and a curve 127 corresponding to a quadratically curved side ($h=(4H/P^2)t^2$) are schematically illustrated.

The condition 0.2<f1<0.8 means that f1 is between 0.2 and 0.8 throughout the range of t from 0 to P/2 (from the second end of the curved side to the peak). In some embodiments, for the at least one of the opposing curved sides, 0.3<f1<0.7. FIG. 3B is a schematic plot of f1 versus t for two different curved sides. In some embodiments, f1 is substantially constant (i.e., substantially independent of t) as schematically illustrated for curve 202. For example, in some embodiments, for the at least one linear structure, f1 is about 0.5 or about 0.6. In some embodiments, for the at least one of the opposing curved sides, f1 changes between 0.2 and 0.8 as distance t changes (i.e., f1 changes with t while remaining between 0.2 to 0.8) as schematically illustrated by curve 204. In some embodiments, for the at least one of the opposing curved sides, f1 has different values for at least two different values of distance t. For example, for curve 204, f1 at the t coordinate 27 is different from f1 at the t coordinate 29.

In some embodiments, for light incident on the structured surface 510 in a direction (plus or minus z-direction) substantially perpendicular to the first and second directions, the structured surface has an average reflectance less than about 0.5%, or less than about 0.4%, or less than about 0.3% for each of two orthogonal polarization states (e.g., polarization states along the x- and y-directions) in a wavelength range extending from about 700 nm to about 1600 nm. In some such embodiments or in other embodiments, for light incident on the structured surface in the direction substantially perpendicular to the first and second directions, an absolute value of a difference between the average reflectances for the two orthogonal polarization states in the wavelength range extending from about 700 nm to about 1600 nm is less than about 0.3%, or less than about 0.25%, or less than about 0.2%.

The structured surface can be formed by any suitable method including machining, embossing, molding, or casting and curing. For example, a tool can be formed via diamond turning, for example, and the structured layer 550 can be formed on the substrate 530 by casting a resin (e.g., an acrylic resin) onto a structured surface of the tool and curing (e.g., ultraviolet curing) the resin while it is contact with the tool and with the substrate 530. Related processes are described in U.S. Pat. No. 5,175,030 (Lu et al.); U.S. Pat. No. 5,183,597 (Lu); U.S. Pat. No. 5,384,571 (Myers et al.); U.S. Pat. No. 5,691,846 (Benson, Jr. et al.); and U.S. Pat. No. 7,185,993 (Smith et al.), for example. In some embodiments, the structured surface is made with an article (e.g., an optical ferrule) in a single molding step, for example.

In some embodiments, an optical ferrule includes the optical film 500 disposed at an exit surface of the optical ferrule. For example, the exit surface may be a window recessed into a major surface of the optical ferrule, as described, for example, in U.S. Pat. Appl. Pub. No. 2018/0275355 (Haase et al.), and the optical film 500 may be disposed in the recessed window. In other embodiments, an optical ferrule includes the structured surface 510 formed on the exit surface (e.g., on a recessed window). In some such embodiments, the second direction (y-direction) makes an angle of about 45 degrees to a mating direction of the optical ferrule. The structured surface 510 may be formed with the optical ferrule in a molding process, for example. In some embodiments, the optical ferrule may be a unitary construction. A unitary construction is a single piece construction that does not have any internal interfaces, joints, or seams. A unitary construction can be made by molding (e.g., injection molding a thermoplastic polymer) or machining, for example.

Figure 6A:
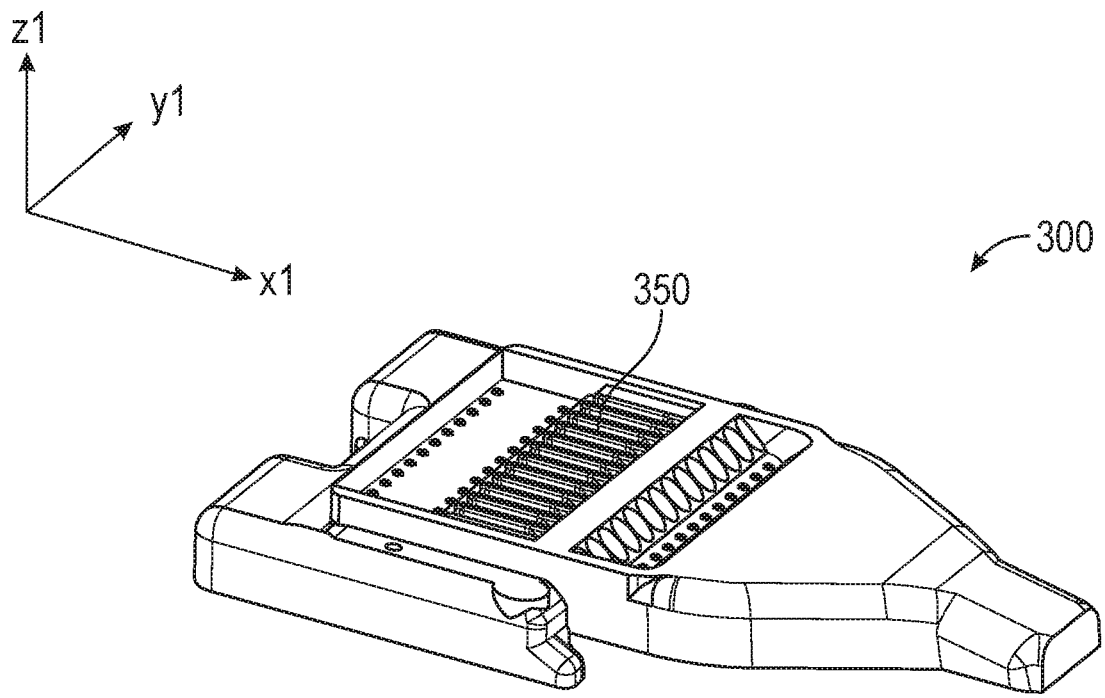
FIGS. 6A-6B are schematic perspective top and bottom views, respectively, of an optical ferrule.
Figure 6B:
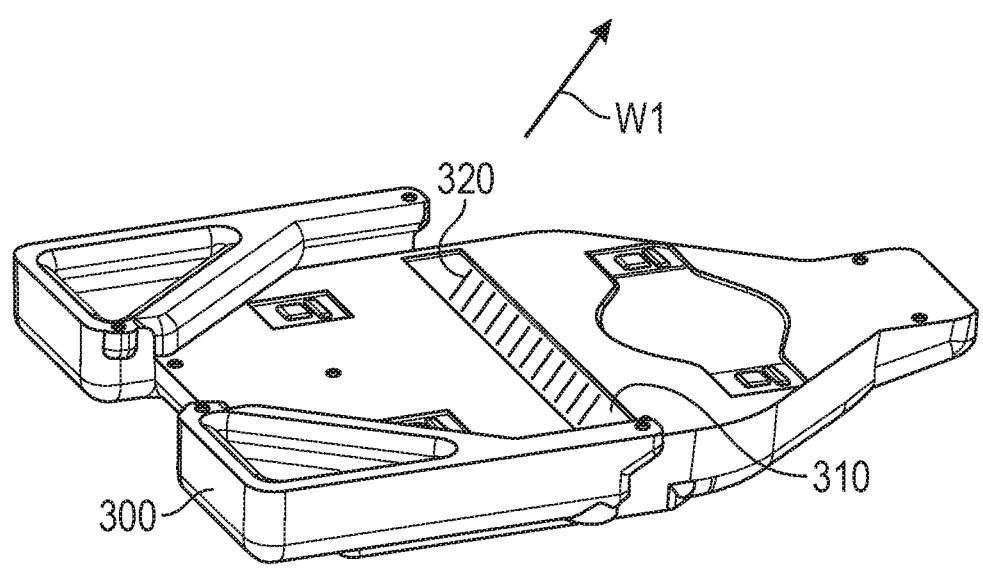
Figure 7:
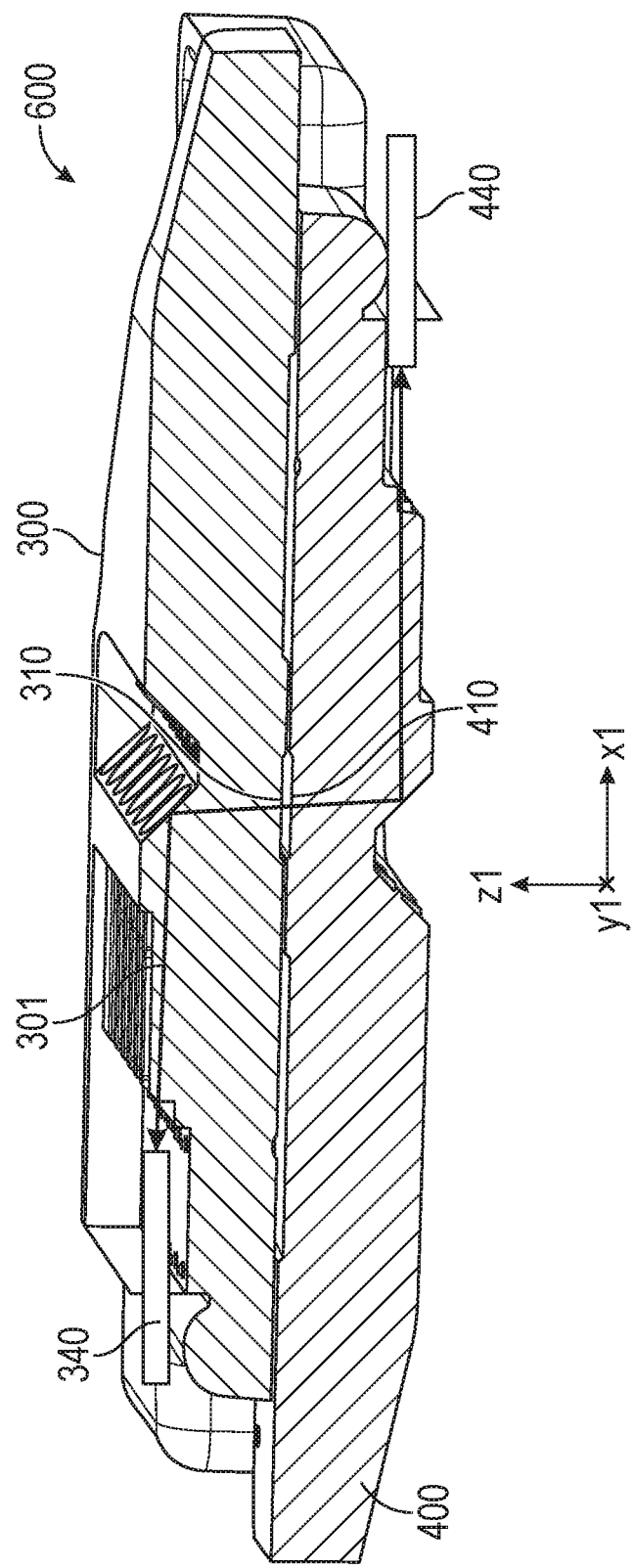
FIG. 7 is a schematic cutaway view of an optical assembly including an optical ferrule 300 mated with a mating optical ferrule.

FIGS. 6A-6B are schematic perspective top and bottom views, respectively, of an optical ferrule 300. FIG. 7 is a schematic cutaway view of an optical assembly 700 including the optical ferrule 300 mated with a mating optical ferrule 400. In some embodiments, the optical ferrule includes a plurality of grooves 350 extending along a first direction (x1-direction) and arranged along an orthogonal second direction (y1-direction). The optical ferrule 300 is for coupling light 301 to the mating optical ferrule 400 through an exit surface 310 of the optical ferrule 300. For example, the light 301 can be coupled between optical fiber(s) 340 received in grooves 350 and corresponding optical fiber(s) 440 received in grooves of the mating optical ferrule 400. The light 301 may propagate in either direction between the optical ferrule 300 and the mating optical ferrule 400 (schematically illustrated in FIG. 7 by the arrow on each end of 301). In some embodiments, a difference between optical transmittances of the exit surface 310 for two mutually orthogonal polarization states (e.g., polarized along the x1-direction and along the y1-direction, respectively) is greater than a first value, such that when the optical ferrule 300 mates with a mating optical ferrule 400 having a mating exit surface 410 similar to the exit surface 310 of the optical ferrule 300 with the exit surface 310 and the mating exit surface 410 facing, and substantially aligned with, each other, a difference between optical transmittances of a combination of the exit surface 310 and the mating exit surface 410 for the two mutually orthogonal polarization states is less than a second value, where the second value is less than the first value. This can occur, for example, when the difference in transmittance of the different polarization states results at least partially from an orientation of linear structures of the exit surface 310, and when the mating exit surface 410 includes linear structures oriented differently so that the polarization dependence of the transmittance of the combination of the exit surfaces is less than (instead of about twice, for example) the polarization dependence of the transmittance of the exit surface 310. In some embodiments, the second value is less than the first value by at least 0.2% (e.g., the first value may be 0.5% and the second value may be 0.3%, so that the second value is less than the first value by 0.2%). In some embodiments, the first value is greater than about 0.5%, and the second value is less than about 0.3%.

In some embodiments, the optical transmittances of the combination of the exit surface 310 and the mating exit surface 410 for each of the two mutually orthogonal polarization states is greater than about 98%, or greater than about 99%.

The mating exit surface 410 is similar to the exit surface 310 when the surfaces have a substantially same size and shape (e.g., nominally the same size and shape and/or where any difference in size and shape negligibly affects the optical performance of the mated ferrules) when the optical ferrule 300 and the mating optical ferrule 400 have a substantially same orientation. For example, the optical ferrule 300 and the mating optical ferrule 400 may be hermaphroditic optical ferrules having a substantially same size and shape such that any variation in the size and shape of the exit surfaces 310 and 410 are due to ordinary manufacturing variations. The mating exit surface 410 and the exit surface 310 are substantially aligned with, each other when the exit surfaces are aligned, or nominally aligned, or aligned within ordinary manufacturing and mating tolerances, or aligned sufficiently accurately that any misalignment has a negligible effect on the optical performance of the mated ferrules.

The grooves 350 may be any suitable grooves such as V-grooves, U-grooves, or Y-grooves. Y-grooves are described in U.S. Pat. Appl. Pub. No. 2018/0284356 (Haase et al.) and 2019/0049671 (Haase et al.).

Figure 8A:
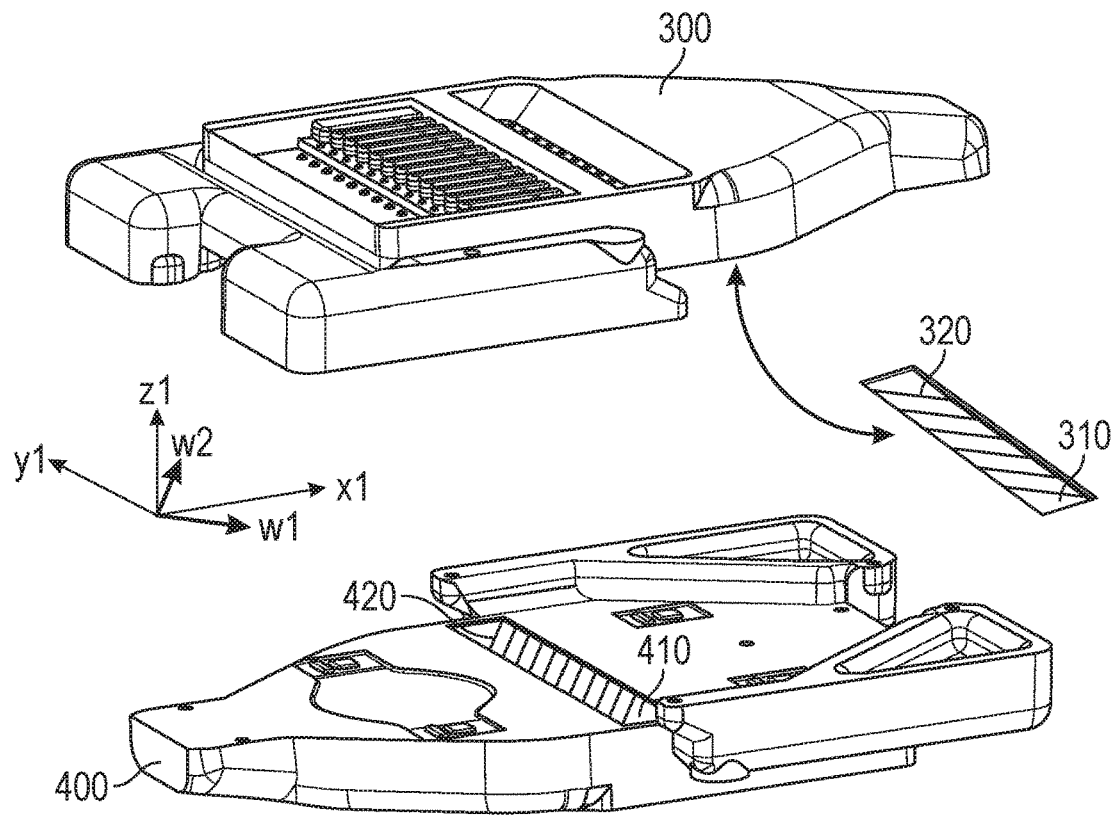
FIGS. 8A-8B are schematic perspective top and bottom views, respectively, of an optical ferrule and a mating optical ferrule.
Figure 8B:
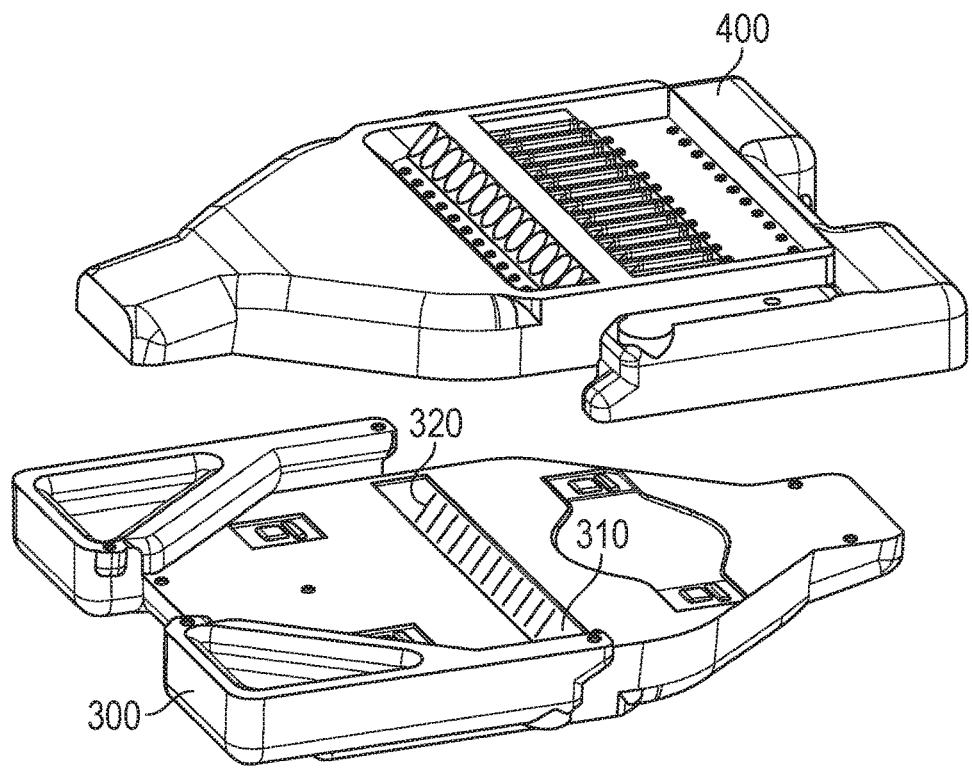

FIGS. 8A-8B are schematic perspective top and bottom views, respectively, of the optical ferrule 300 and the mating optical ferrule 400 disposed proximate one another approximately in a mating position along x1- and y1-directions but displaced along the z1-direction.

In some embodiments, the exit surface 310 of the optical ferrule 300 includes a plurality of substantially parallel first linear structures 320 (e.g., corresponding to structures 10, 110, or 910) extending along a first direction W1, and the mating exit surface 410 of the mating optical ferrule 400 includes a plurality of substantially parallel second linear structures 420 (e.g., corresponding to structures 10, 110, or 910) extending along a second direction W2 different from the first direction W1. It will be understood that the second linear structures 420 extend along the second direction W2 when the exit surface 310 and the mating exit surface 410 face, and are substantially aligned with, each other. In some embodiments, the first and second directions W1 and W2 are substantially orthogonal to each other.

In some embodiments, the optical ferrule 300 is adapted to mate with the mating optical ferrule 400 along a mating direction (x1-direction) and the first and second directions W1 and W2 make an angle of about 45 degrees to the mating direction.

In some embodiments, an optical assembly 600 (see FIG. 7) includes a first optical ferrule 300 optically coupled to a first optical fiber 340 and including a plurality of substantially parallel first linear structures 320 extending along a first direction W1, and includes a second optical ferrule 400 optically coupled to a second optical fiber 440 and including a plurality of substantially parallel second linear structures 420 extending along a second direction W2. The first optical ferrule 300 is mated with the second optical ferrule 400. When light 301 is transmitted from one of the first and second optical fibers 340 and 440 to the other one of the first and second optical fibers 340 and 440 through the first and second optical ferrules 300 and 400, the light passes through the first and second linear structures 320 and 420, such that for a predetermined wavelength in a wavelength range extending from about 600 nm to about 1700 nm, a difference in optical transmittances for two mutually orthogonal polarization states between the first and second optical fibers is greater than about 0.5%, or greater than about 0.8%, or greater than about 1% when the first and second directions W1 and W2 are parallel to each another, and less than about 0.3% when the first and second directions W1 and W2 are substantially orthogonal to each other. In some such embodiments, the difference in optical transmittances for two mutually orthogonal polarization states between the first and second optical fibers is less than about 0.25%, or less than about 0.2% when the first and second directions W1 and W2 are substantially orthogonal to each other.

Figure 9A:
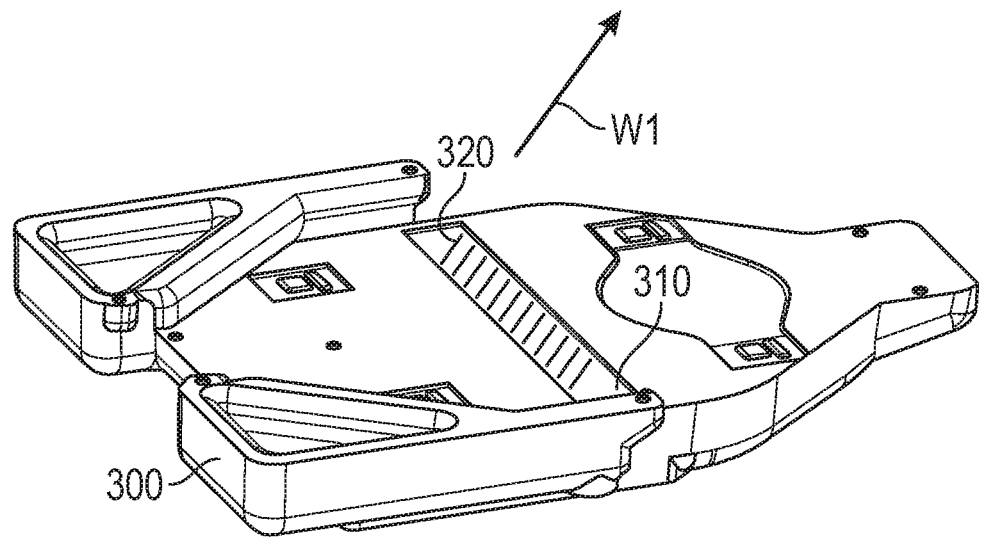
FIGS. 9A-9B are schematic bottom views of first and second optical ferrules.
Figure 9B:
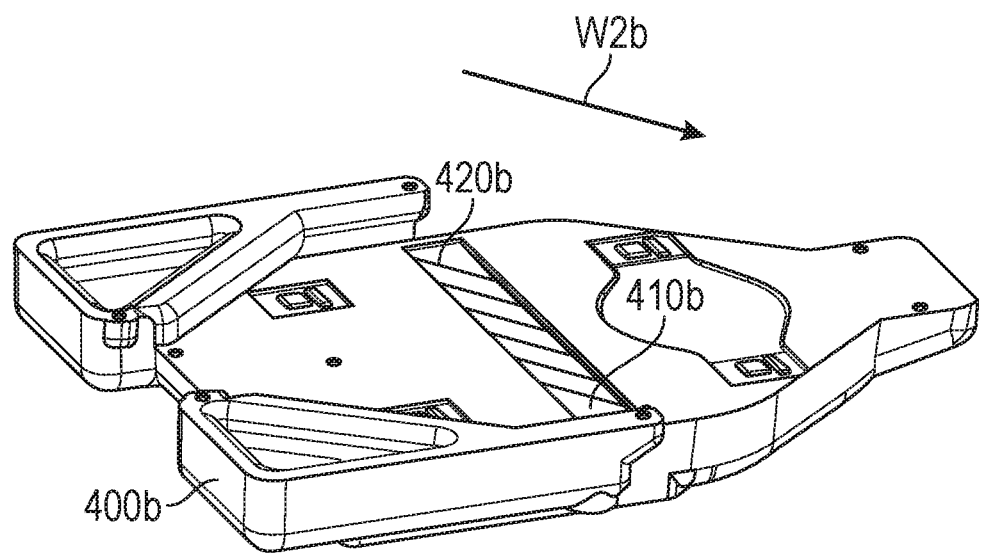

In the embodiment illustrated in FIGS. 8A-8B, the first and second directions W1 and W2 are substantially orthogonal to each other. FIGS. 9A-9B are schematic bottom views of first and second optical ferrules 300 and 400b. Second optical ferrule 400b includes an exit surface 410b including second linear structures 420b extending in a second direction W2b such that when the second optical ferrule 400b is mated with the first optical ferrule 300, the linear structures 420b extend in a direction substantially parallel to the first direction W1. In other words, when the first and second optical ferrules 300 and 400b are mated, the second optical ferrule 400b is rotated relative to the first optical ferrule 300 such that the second direction W2b is substantially parallel to the first direction W1.

In some embodiments, an optical assembly 600 includes the first optical ferrule 300 mated with the second optical ferrule 400 and the first and second directions W1 and W2 are substantially orthogonal to each other. When light 301 is transmitted from one of the first and second optical fibers 340 and 440 to the other one of the first and second optical fibers 340 and 440 through the first and second optical ferrules 300 and 400, the light passes through the first and second linear structures 320 and 420, such that for a predetermined wavelength in a wavelength range extending from about 600 nm to about 1700 nm, a difference in optical transmittances for two mutually orthogonal polarization states between the first and second optical fibers is less than about 0.3%, or less than about 0.25%, or less than about 0.2%. In some embodiments, a comparative optical assembly includes a first optical ferrule 300 optically coupled to a first optical fiber 340 and including a plurality of substantially parallel first linear structures 320 extending along a first direction W1, and includes a second optical ferrule 400b optically coupled to a second optical fiber (corresponding to optical fiber) 440 and including a plurality of substantially parallel second linear structures 420b extending along a second direction. The first optical ferrule 300 is mated with the second optical ferrule 400b of the comparative optical assembly and the first and second directions are substantially parallel to each other. When light is transmitted from one of the first and second optical fibers of the comparative optical assembly to the other one of the first and second optical fibers through the first and second optical ferrules 300 and 400b, the light passes through the first and second linear structures 320 and 420b, such that for a predetermined wavelength in a wavelength range extending from about 600 nm to about 1700 nm, a difference in optical transmittances for two mutually orthogonal polarization states between the first and second optical fibers is greater than about 0.5%, or greater than about 0.8%, or greater than about 1%.

One or more of the optical ferrules may be used in an optical connector. Optical connectors and optical ferrules are described in U.S. Pat. Appl. Publ. Nos. 2015/0247979 (Richmond et al.), 2018/0128996 (Sawicki et al.), 2018/0239091 (Mathews et al.), 2018/0275353 (Haase et al.), and 2019/0049671 (Haase et al.), for example. Other features of optical ferrules that may be included in the optical ferrules of the present description are described in in Prov. Appl. No. 62/806,146 titled "Optical Ferrule" and filed on Feb. 15, 2019, in Prov. Appl. No. 62/691,871 titled "Optical Ferrule Having Compound Stops" and filed on Jun. 29, 2018, and in Prov. Appl. No. 62/691,477 titled "Light Coupling Element and Assembly" and filed on Jun. 28, 2018, for example.

The following is a list of illustrative embodiments of the present description.

A first embodiment is a structured surface for reducing optical reflectance at a predetermined wavelength in a first wavelength range extending from about 600 nm to about 1700 nm, the structured surface comprising a plurality of substantially parallel linear structures arranged along a first direction and extending along a substantially orthogonal second direction, each linear structure comprising opposing nonlinear facets meeting at a peak extending along the second direction, an average spacing between the peaks of adjacent linear structures less than the predetermined wavelength, such that for light having the predetermined wavelength and incident on the structured surface in a direction substantially perpendicular to the first and second directions, the structured surface has a reflectance Rx<0.5% for light polarized along the first direction and a reflectance Ry<0.5% for light polarized along the second direction, an absolute value of Rx−Ry less than about 0.3%.

A second embodiment is the structured surface of the first embodiment, wherein the predetermined wavelength is about 850 nm, or about 1310 nm, or about 1550 nm.

A third embodiments is the structured surface of the first or second embodiments, wherein at least two adjacent linear structures in the plurality of substantially parallel linear structures are spaced apart defining a land surface therebetween.

A fourth embodiment is the structured surface of any one of the first through third embodiments, wherein for each wavelength in the first wavelength range and for light incident on the structured surface in the direction substantially perpendicular to the first and second directions, the structured surface has a first reflectance less than 0.5% for light polarized along the first direction and a second reflectance less than 0.5% for light polarized along the second direction, an absolute value of the difference between the first and second reflectances being less than about 0.3%.

A fifth embodiment is the structured surface of any one of the first through fourth embodiments, wherein the structured surface is exposed to an exterior medium and defines an exterior side opposite an interior side, and wherein for light having the predetermined wavelength and incident on the structured surface from the exterior side of the structured surface in the direction substantially perpendicular to the first and second directions, Rx<0.5%, Ry<0.5%, and the absolute value of Rx−Ry is less than about 0.3%. In some embodiments, the exterior medium is air, for example.

A sixth embodiment is a structured surface comprising a plurality of substantially parallel linear structures arranged along a first direction and extending along a substantially orthogonal second direction, each linear structure comprising opposing curved facets meeting at a peak extending along the second direction,
such that in a cross-section of the structured surface in a plane substantially perpendicular to the second direction and for at least one linear structure, the linear structure comprises:
    opposing curved sides comprising first ends meeting at a peak of the structure and opposing second ends defining a base extending therebetween along substantially the first direction; and
    a peak height H relative to the base,
    wherein for at least one of the opposing curved sides, a local height h of the curved side is governed by the equation: $h=f1(2H/P)t+(1-f1)(4H/P^2)t^2$, where P is separation between the opposing second ends of the structure, t is distance from the second end of the curved side along the base, and $0.2<f1<0.8$, and
wherein, for light incident on the structured surface in a direction substantially perpendicular to the first and second directions, the structured surface has an average reflectance less than about 0.5% for each of two orthogonal polarization states in a wavelength range extending from about 700 nm to about 1600 nm.

A seventh embodiment is the structured surface of the sixth embodiment, wherein for light incident on the structured surface in the direction substantially perpendicular to the first and second directions, an absolute value of a difference between the average reflectances for the two orthogonal polarization states in the wavelength range extending from about 700 nm to about 1600 nm is less than about 0.3%.

An eight embodiment is the structured surface of the sixth or seventh embodiments, wherein for the at least one of the opposing curved sides, f1 is about 0.5.

A ninth embodiment is the structured surface of the sixth or seventh embodiments, wherein for the at least one of the opposing curved sides, f1 has different values for at least two different values of distance t.

A tenth embodiment is an optical film comprising a first structured major surface comprising the structured surface of any one of the first through ninth embodiments and an opposing second major surface.

An eleventh embodiment is an optical ferrule for coupling light to a mating optical ferrule through an exit surface of the optical ferrule, the exit surface comprising the structured surface of any one of the first through ninth embodiments, the second direction making an angle of about 45 degrees to a mating direction of the optical ferrule.

A twelfth embodiment is an optical ferrule for coupling light to a mating optical ferrule through an exit surface of the optical ferrule, a difference between optical transmittances of the exit surface for two mutually orthogonal polarization states greater than a first value, such that when the optical ferrule mates with the mating optical ferrule having a mating exit surface similar to the exit surface of the optical ferrule with the exit surface and the mating exit surface facing, and substantially aligned with, each other, a difference between optical transmittances of a combination of the exit surface and the mating exit surface for the two mutually orthogonal polarization states is less than a second value, the second value less than the first value.

A thirteenth embodiment is the optical ferrule of the twelfth embodiment, wherein the first value is greater than about 0.5%, and the second value is less than about 0.3%.

A fourteenth embodiment is the optical ferrule of the twelfth or thirteenth embodiments, wherein the exit surface of the optical ferrule comprises a plurality of substantially parallel first linear structures extending along a first direction, and the mating exit surface of the mating optical ferrule comprises a plurality of substantially parallel second linear structures extending along a second direction different from the first direction.

A fifteenth embodiment is an optical assembly comprising:
a first optical ferrule optically coupled to a first optical fiber and comprising a plurality of substantially parallel first linear structures extending along a first direction; and
a second optical ferrule optically coupled to a second optical fiber and comprising a plurality of substantially parallel second linear structures extending along a second direction, the first optical ferrule mated with the second optical ferrule, wherein when light is transmitted from one of the first and second optical fibers to the other one of the first and second optical fibers through the first and second optical ferrules, the light passes through the first and second linear structures, such that for a predetermined wavelength in a wavelength range extending from about 600 nm to about 1700 nm, a difference in optical transmittances for two mutually orthogonal polarization states between the first and second optical fibers is greater than about 0.5% when the first and second directions are parallel to each another, and less than about 0.3% when the first and second directions are substantially orthogonal to each other.

EXAMPLES

Optical modeling of a structured surface was carried out using the Finite-Difference Time-Domain (FDTD) method. The structured surface included a plurality of substantially parallel linear structures, each structure having opposing curved sides including first ends meeting at a peak of the structure and opposing second ends defining a base 230 extending therebetween (see, e.g., FIG. 3A). The structures were arranged at a pitch P1 (distance between adjacent peaks). Each structure had a peak height H relative to the base. For each curved side of each structure, a local height h of the curved side was given by the equation $h(t)=f1(2H/P)t+(1-f1)(4H/P^2)t^2$, where P is the separation between the opposing second ends of the structure, and t is the distance from the second end of the curved side along the base. The structures were adjacent each other with substantially no land surface therebetween so that P and P1 were about equal. The structured surface was a surface of a layer modeled as having a constant refractive index of 1.523. The structured surface was modeled as being exposed to air. The reflectance Rx, Ry for normally incident light and for polarization states perpendicular (Rx) and parallel (Ry) to an extension direction of the linear structures were calculated for wavelengths in the range 0.7 to 1.7 micrometers and the minimum and maximum values of constant f1 in the range 0≤f1≤1 that resulted in the reflectance for each polarization state being less than 0.5% throughout the wavelength range and that resulted in an absolute value of a difference in the reflectances for the orthogonal polarization states being less than 0.25% throughout the wavelength range were determined and are reported in the table below. When no value of f1 resulted in the reflectances meeting these specified limits, a value of "None" is reported. A broader range of f1 than indicated in the table may be utilized when the specified limit in the difference in the reflectances for the orthogonal polarization states is increased to 0.3%, for example, and/or when the specified limits for the reflectances is applied to specific predetermined wavelength(s) instead of the entire wavelength range, for example.

| Pitch P1 (nm) | Height H (nm) | Min f1 | Max f1 |
| --- | --- | --- | --- |
| 400 | 500 | None | None |
| 400 | 555.6 | 0.7 | 0.8 |
| 400 | 625 | 0.6 | 1 |
| 400 | 690 | 0.43 | 1 |
| 400 | 769 | 0.3 | 1 |
| 400 | 870 | 0.32 | 1 |
| 400 | 1000 | 0.32 | 1 |
| 500 | 521 | None | None |
| 500 | 568 | 0.6 | 0.8 |
| 500 | 625 | 0.55 | 0.85 |
| 500 | 679 | 0.42 | 0.9 |
| 500 | 744 | 0.35 | 0.95 |
| 500 | 822 | 0.3 | 1 |
| 500 | 905 | 0.28 | 1 |
| 500 | 1157 | 0.28 | 1 |
| 600 | 562.5 | 0.6 | 0.62 |
| 600 | 600 | 0.5 | 0.7 |
| 600 | 643 | 0.45 | 0.79 |
| 600 | 692 | 0.35 | 0.84 |
| 600 | 750 | 0.25 | 0.9 |
| 600 | 818 | 0.18 | 0.94 |
| 600 | 900 | 0.2 | 1 |
| 600 | 1000 | 0.22 | 1 |

In an example where the structures had a height of 568 nm, a pitch of 500 nm, and an f1 of 0.5, the reflectances Rx, Ry were each less than 0.3% throughout a wavelength range of 0.7 micrometers to 1.55 micrometers. At a wavelength of 850 nm, Rx was 0.166% and Ry was 0.088%. At a wavelength of 1310 nm, Rx was 0.164% and Ry was 0.105%. At a wavelength of 1550 nm, Rx was 0.293% and Ry was 0.048%.

In an example where the structures had a height of 625 nm, a pitch of 500 nm, and an f1 of 0.5, the reflectances Rx, Ry were each less than 0.3% throughout the wavelength range of 0.7 micrometers to 1.7 micrometers. At a wavelength of 850 nm, Rx was 0.09% and Ry was ~0.01%. At a wavelength of 1310 nm, Rx was 0.206% and Ry was 0.192%. At a wavelength of 1550 nm, Rx was 0.202% and Ry was 0.043%.

Terms such as "substantially" will be understood in the context in which they are used and described in the present description by one of ordinary skill in the art. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially perpendicular" or "substantially orthogonal" is not otherwise clear to one of ordinary skill in the art in the context in which it is used and described in the present description, "substantially perpendicular" or "substantially orthogonal" will mean within 30 degrees of perpendicular. Directions or surfaces described as substantially perpendicular, or substantially orthogonal, to one another may, in some embodiments, be within 20 degrees or within 10 degrees of perpendicular or may be nominally perpendicular.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A structured surface comprising a plurality of substantially parallel linear structures arranged along a first direction and extending along a substantially orthogonal second direction, each linear structure comprising opposing curved facets meeting at a peak extending along the second direction, such that in a cross-section of the structured surface in a plane substantially perpendicular to the second direction and for at least one linear structure, the linear structure comprises:

opposing curved sides comprising first ends meeting at a peak of the structure and opposing second ends defining a base extending therebetween along substantially the first direction; and a peak height H relative to the base, wherein for at least one of the opposing curved sides, a local height h of the curved side is governed by the equation: $h = f1(2H/P)t + (1-f1)(4H/P^2)t^2$, where P is separation between the opposing second ends of the structure, t is distance from the second end of the curved side along the base, and $0.2 < f1 < 0.8$, and wherein, for light incident on the structured surface in a direction substantially perpendicular to the first and second directions, the structured surface has an average reflectance less than about 0.5% for each of two orthogonal polarization states in a wavelength range extending from about 700 nm to about 1600 nm.

2. The structured surface of claim 1, wherein for light incident on the structured surface in the direction substantially perpendicular to the first and second directions, an absolute value of a difference between the average reflectances for the two orthogonal polarization states in the wavelength range extending from about 700 nm to about 1600 nm is less than about 0.3%.

3. The structured surface of claim 1, wherein for the at least one of the opposing curved sides, f1 is about 0.5.

4. The structured surface of claim 1, wherein for the at least one of the opposing curved sides, f1 has different values for at least two different values of distance t.

5. The structured surface of claim 1, wherein at least two adjacent linear structures in the plurality of substantially parallel linear structures are spaced apart defining a land surface therebetween.

6. The structured surface of claim 1, wherein for each wavelength in a wavelength range extending from about 600 nm to about 1700 nm and for light incident on the structured surface in the direction substantially perpendicular to the first and second directions, the structured surface has a first reflectance less than 0.5% for light polarized along the first direction and a second reflectance less than 0.5% for light polarized along the second direction, an absolute value of the difference between the first and second reflectances being less than about 0.3%.

7. The structured surface of claim 1, wherein the structured surface is exposed to an exterior medium and defines an exterior side opposite an interior side, and wherein for light having a predetermined wavelength in a wavelength range extending from about 600 nm to about 1700 nm and incident on the structured surface from the exterior side of the structured surface in the direction substantially perpendicular to the first and second directions, the structured surface has a reflectance $Rx<0.5\%$ for light polarized along the first direction and a reflectance $Ry<0.5\%$ for light polarized along the second direction, an absolute value of $Rx-Ry$ less than about 0.3%.

8. An optical film comprising a first structured major surface comprising the structured surface of claim 1 and an opposing second major surface.

9. An optical ferrule for coupling light to a mating optical ferrule through an exit surface of the optical ferrule, the exit surface comprising the structured surface of claim 1, the second direction making an angle of about 45 degrees to a mating direction of the optical ferrule.

* * * * *